United States Patent
Swier et al.

(10) Patent No.: US 11,015,025 B2
(45) Date of Patent: May 25, 2021

(54) HYDROSILYLATION CURABLE POLYSILOXANE

(71) Applicant: Dow Silicones Corporation, Midland, MI (US)

(72) Inventors: Steven Swier, Midland, MI (US); Fumito Nishida, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 16/606,971

(22) PCT Filed: Jun. 19, 2018

(86) PCT No.: PCT/US2018/038142
§ 371 (c)(1),
(2) Date: Oct. 21, 2019

(87) PCT Pub. No.: WO2019/022861
PCT Pub. Date: Jan. 31, 2019

(65) Prior Publication Data
US 2020/0140619 A1  May 7, 2020

Related U.S. Application Data

(60) Provisional application No. 62/537,575, filed on Jul. 27, 2017.

(51) Int. Cl.
| | | |
|---|---|---|
| *C08G 77/20* | (2006.01) | |
| *C08G 77/44* | (2006.01) | |
| *C08L 83/10* | (2006.01) | |
| *C08G 77/00* | (2006.01) | |

(52) U.S. Cl.
CPC ............ *C08G 77/44* (2013.01); *C08G 77/20* (2013.01); *C08L 83/10* (2013.01); *C08G 77/70* (2013.01); *C08G 77/80* (2013.01)

(58) Field of Classification Search
CPC .......... C08L 83/04; C08G 77/80; C08G 77/20
USPC .................................................... 528/32, 43
See application file for complete search history.

(56) References Cited

U.S. PATENT DOCUMENTS

| | | | |
|---|---|---|---|
| 7,282,270 B2 | 10/2007 | Morita et al. | |
| 8,164,202 B2* | 4/2012 | Kashiwagi | H01L 33/56 257/791 |
| 8,258,502 B2 | 9/2012 | Yoshitake et al. | |
| 8,569,429 B2* | 10/2013 | Hamamoto | C08G 77/12 525/477 |
| 8,614,282 B2* | 12/2013 | Hamamoto | H01L 23/296 525/477 |
| 9,006,358 B2* | 4/2015 | Horstman | C08L 83/10 525/477 |
| 9,150,727 B2* | 10/2015 | Horstman | H01L 23/296 |
| 9,371,447 B2* | 6/2016 | Huang | C08K 5/56 |
| 2008/0185601 A1 | 8/2008 | Frisch et al. | |
| 2010/0213502 A1* | 8/2010 | Kashiwagi | H01L 33/56 257/100 |
| 2012/0056236 A1* | 3/2012 | Hamamoto | C08L 83/04 257/100 |
| 2013/0161683 A1* | 6/2013 | Hamamoto | C08G 77/12 257/100 |
| 2013/0165602 A1* | 6/2013 | Horstman | C08G 77/16 525/477 |
| 2014/0008697 A1 | 1/2014 | Harkness et al. | |
| 2015/0031826 A1* | 1/2015 | Horstman | C08L 83/10 524/588 |
| 2015/0073077 A1* | 3/2015 | Horstman | C08G 77/70 524/268 |
| 2015/0207047 A1 | 7/2015 | Amako et al. | |
| 2015/0267053 A1* | 9/2015 | Huang | C08L 83/04 257/100 |
| 2016/0032148 A1* | 2/2016 | Amako | H01L 31/0547 156/60 |
| 2016/0215141 A1* | 7/2016 | Chon | C08K 5/56 |

* cited by examiner

*Primary Examiner* — Margaret G Moore

(57) ABSTRACT

A composition comprising: (a) a component comprising units of $Ar^1SiO_{3/2}$, wherein $Ar^1$ is $C_6$-$C_{20}$ aryl and units of $PhCH_3SiO_{2/2}$, and having $M_w$ from 20,000 to 90,000; and (b) an elastomeric component comprising: (i) a straight-chain organopolysiloxane having at least two silicon-bonded alkenyl groups and at least one silicon-bonded aryl group; (ii) a branched-chain organopolysiloxane having formula: $(RSiO_{3/2})a(R_2SiO_{2/2})b(R_3SiO_{1/2})c(SiO_{4/2})d(XO_{1/2})e$ where each R is the same or different $C_1$-$C_{20}$ hydrocarbyl group, 0.1 to 40 mole % of all R's are alkenyl, more than 10 mole % of all R's are $C_6$-$C_{20}$ aryl, X is a hydrogen atom or alkyl, a is 0.45 to 0.95, b is 0 to 0.25, c is 0.05 to 0.5, d is 0 to 0.1, e is 0 to 0.1, c/a is 0.1 to 0.5; (iii) an organopolysiloxane having at least two silicon-bonded hydrogen atoms; and (iv) a hydrosilylation catalyst.

10 Claims, No Drawings

HYDROSILYLATION CURABLE POLYSILOXANE

This invention relates to a hydrosilylation curable polysiloxane useful for semiconductor encapsulation.

Hydrosilylation curable silicone compositions comprising alkylsiloxane units are known, including encapsulants for light emitting diodes (LED), but the known compositions do not exhibit a combination of toughness and hardness. Hydrosilylation curable silicone compositions useful as encapsulants are known, e.g., in U.S. Pat. No. 7,282,270. However, this reference does not teach the compositions of the present invention.

STATEMENT OF THE INVENTION

The present invention provides a curable organopolysiloxane composition comprising: (a) a resin-linear component comprising from 10 to 70 wt % units of $Ar^1SiO_{3/2}$, wherein $Ar^1$ is $C_6$-$C_{20}$ aryl and from 30 to 90 wt % units of $PhCH_3SiO_{2/2}$, wherein Ph is phenyl; said resin-linear component has from 0 to 5 mole % alkenyl groups, and no more than 20 mole % silanol; said resin-linear component having $M_w$ from 20,000 to 90,000; and (b) an elastomeric component comprising: (i) a straight-chain organopolysiloxane having per molecule at least two silicon-bonded alkenyl groups and at least one silicon-bonded aryl group; (ii) a branched-chain organopolysiloxane having an average unit formula: $(RSiO_{3/2})_a(R_2SiO_{2/2})_b(R_3SiO_{1/2})_c(SiO_{4/2})_d$ $(XO_{1/2})_e$ where each R is the same or different substituted or unsubstituted monovalent $C_1$-$C_{20}$ hydrocarbyl group, 0.1 to 40 mole % of all R's are alkenyl groups, more than 10 mole % of all R's are $C_6$-$C_{20}$ aryl groups, X is a hydrogen atom or an alkyl group, a is from 0.45 to 0.95, b is from 0 to 0.25, c is from 0.05 to 0.5, d is from 0 to 0.1, e is from 0 to 0.1, c/a is 0.1 to 0.5, and where component (ii) is used in a weight ratio of 1/99 to 99/1 based on the weight of component (i); (iii) an organopolysiloxane having per molecule at least two silicon-bonded hydrogen atoms, where component (iii) is used in an amount of 1 to 200 parts by weight for each 100 parts by weight of the total weight of parts (i) and (ii); and (iv) a hydrosilylation catalyst in an amount sufficient to promote curing of the composition.

DETAILED DESCRIPTION

Percentages are weight percentages (wt %) and temperatures are in ° C. unless specified otherwise. Operations were performed at room temperature unless specified otherwise. Alkyl groups are saturated hydrocarbyl groups that may be straight or branched. Preferably, alkyl groups have from one to six carbon atoms, preferably one or two. Alkenyl groups are hydrocarbyl groups that may be straight or branched and which have at least one aliphatic carbon-carbon double bond, preferably one aliphatic carbon-carbon double bond. Preferably, alkenyl groups have no aromatic rings. Preferably, alkyl and alkenyl groups are unsubstituted. Aryl groups are derived from aromatic compounds which can be mono- or poly-nuclear. Aryl groups may be substituted by alkyl or alkoxy groups. Preferably, aryl groups are unsubstituted. Preferably, aryl groups are hydrocarbyl groups.

As used herein, unless otherwise indicated, molecular weights, $M_n$, $M_w$ and $M_z$ have the conventional meanings and are determined by gel permeation chromatography. Molecular weights are reported herein in units of g/mol.

Preferably, $Ar^1$ is $C_6$-$C_{10}$ aryl, preferably $C_6$-$C_8$ aryl, preferably phenyl. Preferably, the resin-linear component comprises from 20 to 60 wt % units of $Ar^1SiO_{3/2}$ and from 40 to 80 wt % units of $PhCH_3SiO_{2/2}$, preferably from 30 to 55 wt % units of $Ar^1SiO_{3/2}$ and from 45 to 70 wt % units of $PhCH_3SiO_{2/2}$, preferably from 40 to 55 wt % units of $Ar^1SiO_{3/2}$ and from 45 to 60 wt % units of $PhCH_3SiO_{2/2}$. Preferably, the linear part of the resin-linear component comprises from 50 to 250 units of $PhCH_3SiO_{2/2}$, preferably from 70 to 220, preferably from 80 to 200, preferably from 90 to 190. Preferably, the resin-linear component has $M_w$ from 30,000 to 90,000, preferably 40,000 to 80,000. Preferably, the resin-linear component has from 0 to 2 mole % alkenyl groups, preferably from 0 to 1 mole %, preferably from 0 to 0.5 mole %, preferably from 0 to 0.1 mole %. Preferably, the resin-linear component has no more than 18 mole % silanol, preferably no more than 16 mole %, preferably no more than 14 mole %, preferably no more than 12 mole %, preferably no more than 10 mole %, preferably no more than 8 mole %, preferably no more than 6 mole %, preferably no more than 4 mole %, preferably no more than 2 mole %, preferably no more than 1 mole %.

Preferably, component (i) of the elastomeric component comprises units of $R^1R^2SiO_{2/2}$, wherein $R^1$ and $R^2$ independently are $C_1$-$C_{20}$ hydrocarbyl groups. Preferably, $R^1$ is $C_6$-$C_{20}$ aryl, preferably $C_6$-$C_{10}$ aryl, preferably $C_6$-$C_8$ aryl, preferably phenyl. Preferably, $R^2$ is $C_1$-$C_{20}$ alkyl or $C_2$-$C_{20}$ alkenyl, preferably $C_1$-$C_{10}$ alkyl or $C_2$-$C_{10}$ alkenyl, preferably $C_1$-$C_4$ alkyl or $C_2$-$C_4$ alkenyl, preferably $C_1$-$C_4$ alkyl, preferably methyl or ethyl, preferably methyl. Preferably, component (i) comprises from 5 to 50 units of $R^1R^2SiO_{2/2}$, preferably from 10 to 40, preferably from 15 to 35, preferably from 18 to 32. Preferably, component (i) comprises terminal units of $R^3R^4R^5SiO_{1/2}$, wherein $R^3$, $R^4$ and $R^5$ independently are $C_1$-$C_{20}$ hydrocarbyl groups, preferably $C_1$-$C_{10}$ alkyl or $C_2$-$C_{10}$ alkenyl. Preferably, $R^3$ is $C_2$-$C_{10}$ alkenyl, preferably $C_2$-$C_6$ alkenyl, preferably $C_2$-$C_4$ alkenyl, preferably vinyl. Preferably, $R^4$ and $R^5$ independently are $C_1$-$C_{10}$ alkyl, preferably $C_1$-$C_4$ alkyl, preferably methyl or ethyl, preferably methyl.

Preferably, in component (ii) of the elastomeric component, a is from 0.55 to 0.9, preferably from 0.6 to 0.85, preferably from 0.65 to 0.8. Preferably, in the $RSiO_{3/2}$ unit, R comprises at least 50 wt % $C_6$-$C_{20}$ aryl groups (preferably $C_6$-$C_{10}$ aryl, preferably $C_6$-$C_8$ aryl, preferably phenyl), preferably at least 75 wt %, preferably at least 90 wt %, preferably at least 95 wt %, preferably at least 98 wt %. Preferably, b is from 0 to 0.15, preferably 0 to 0.1, preferably 0 to 0.05, preferably 0 to 0.01, preferably 0. Preferably, c is from 0.1 to 0.45, preferably from 0.15 to 0.4, preferably from 0.18 to 0.32. Preferably, d is from 0 to 0.05, preferably 0 to 0.01, preferably 0 to 0.001, preferably 0. Preferably, e is from 0 to 0.1, preferably 0 to 0.05, preferably 0 to 0.01, preferably 0. Preferably, in the $R_3SiO_{1/2}$ unit, R comprises at least 20 wt % $C_2$-$C_{20}$ alkenyl groups (preferably $C_2$-$C_{10}$ alkenyl, preferably $C_2$-$C_4$ alkenyl, preferably vinyl), preferably at least 25 wt %, preferably at least 27 wt %, preferably at least 29 wt %; preferably no more than 50 wt %, preferably no more than 40 wt %, preferably no more than 37 wt %.

Preferably, component (iii) of the elastomeric component comprises units of $R^6R^7SiO_{2/2}$, wherein $R^6$ and $R^7$ independently are $C_1$-$C_{20}$ hydrocarbyl groups. Preferably, $R^6$ and $R^7$ are $C_6$-$C_{20}$ aryl, $C_1$-$C_{20}$ alkyl or $C_2$-$C_{20}$ alkenyl; preferably $C_6$-$C_{10}$ aryl, $C_1$-$C_{10}$ alkyl or $C_2$-$C_{10}$ alkenyl; preferably $C_6$-$C_{10}$ aryl, $C_1$-$C_4$ alkyl or $C_2$-$C_4$ alkenyl; preferably $C_6$-$C_8$ aryl, preferably phenyl. Preferably, component (iii) comprises from 1 to 5 units of $R^6R^7SiO_{2/2}$, preferably 1 to 3, preferably 1 or 2, preferably 1. Preferably, component (iii)

comprises terminal units of $R^8R^9R^{10}SiO_{1/2}$, wherein $R^8$, $R^9$ and $R^{10}$ independently are hydrogen or $C_1$-$C_{20}$ hydrocarbyl groups, preferably hydrogen or $C_1$-$C_{10}$ alkyl. Preferably, $R^8$ is hydrogen and $R^9$ and $R^{10}$ are hydrogen or $C_1$-$C_4$ alkyl, preferably $C_1$-$C_4$ alkyl, preferably methyl or ethyl, preferably methyl. Preferably, component (iii) has per molecule from 2 to 5 silicon-bonded hydrogen atoms, preferably from 2 to 4, preferably 2 or 3, preferably 2.

Preferably, the elastomeric component comprises from 3 to 30 wt % of component (i), preferably 7 to 23 wt %, preferably 10 to 20 wt %. Preferably, the elastomeric component comprises from 40 to 80 wt % of component (ii), preferably 45 to 75 wt %, preferably 50 to 70 wt %, preferably 55 to 67 wt %. Preferably, the elastomeric component comprises from 5 to 40 wt % of component (iii), preferably 10 to 35 wt %, preferably 15 to 30 wt %.

Preferably, the curable organopolysiloxane comprises from 5 to 70 wt % of the resin-linear component and from 30 to 95 wt % of the elastomeric component; preferably at least 10 wt % of the resin-linear component, preferably at least 15 wt %, preferably at least 20 wt %, preferably at least 25 wt %, preferably at least 30 wt %, preferably at least 35 wt %, preferably at least 40 wt %, preferably at least 45 wt %; preferably no more than 90 wt % of the elastomeric component, preferably no more than 85 wt %, preferably no more than 80 wt %, preferably no more than 75 wt %, preferably no more than 70 wt %, preferably no more than 65 wt %, preferably no more than 60 wt %, preferably no more than 55 wt %.

Preferably, the mixture of components (a) and (b) is heated to a temperature from 70 to 180° C. to cure the composition, preferably from 90 to 170° C., preferably from 110 to 170° C., preferably from 125 to 165° C.

Preferably, the hydrosilylation catalyst is present in the curable organopolysiloxane composition in a catalytic quantity along with the polysiloxane in an amount sufficient to promote curing of the composition. Suitable hydrosilylation catalysts include, without limitation, a platinum group metal which includes platinum, rhodium, ruthenium, palladium, osmium, or iridium metal or an organometallic compound thereof and a combination of any two or more thereof. In a preferred embodiment, the hydrosilylation catalyst is platinum black, platinum compounds such as chloroplatinic acid, chloroplatinic acid hexahydrate, a reaction product of chloroplatinic acid and a monohydric alcohol, platinum bis(ethylacetoacetate), platinum bis(acetylacetonate), platinum dichloride, and complexes of the platinum compounds with olefins or low molecular weight organopolysiloxanes or platinum compounds microencapsulated in a matrix or core-shell type structure.

Preferably, the hydrosilylation catalyst is present in the curable organopolysiloxane composition in an amount from 0.1 to 5 ppm; preferably at least 0.2 ppm, preferably at least 0.25 ppm; preferably no more than 3 ppm, preferably no more than 2 ppm, preferably no more than 1.5 ppm, preferably no more than 1 ppm, preferably no more than 0.7 ppm, preferably no more than 0.5 ppm.

EXAMPLES

Example 1: Synthesis of 45 wt % Ph-T—120 dp PhMe Resin-Linear

A 500 mL 3 neck round bottom flask was loaded with toluene (68.0 g)+Dow Corning 217 flake (27.0 g). The flask was equipped with a thermometer, teflon stir paddle, and a Dean Stark apparatus attached to a water-cooled condenser. A nitrogen blanket was applied. Dean Stark was prefilled with toluene. An oil bath was used for heating. The mixture was then heated at reflux for 30 minutes, and subsequently cooled to 108° C. (pot temperature). A solution of toluene (22.0 g)+silanol terminated PhMe siloxane (33.0 g) (end-blocked with 50/50 methyl triacetoxysilane/ethyl triacetoxysilane—MTA/ETA Gelest (1.04 g, 0.00450 mols Si) was prepared in a glove box (same day) under nitrogen by adding the MTA/ETA to the polymer and mixing at room temperature for 2 hrs. This solution was added to the Dow Corning 217 flake solution ($T^{Ph}$) quickly at 108° C., and heated at reflux for 4 hrs. The reaction mixture was then cooled to 108° C., and 50/50 MTA/ETA (4.79 g, 0.0207 mols Si) added. After heating at reflux for 2 hrs, the mixture was cooled to a pot temperature of 90° C. and DI water (4.54 g) then added. The mixture was heated at reflux for 1 hr (no removal of water). The mixture was then heated at reflux and water removed via azeotropic distillation, 20 min (~109° C.). Heating continued at reflux for an additional 3 hrs. No more water was collecting in the Dean Stark at this time. The mixture was cooled to 100° C. and pre-dried Darco G60 carbon black (0.60 g) added. After cooling to room temperature with stirring and then stirred overnight at room temperature. The reaction mixture was pressure filtered through a 0.45 μm filter the following day. $^{29}$Si NMR was used to determine the final composition: 52 mol % $D^{PhMe}$, 5 mol % $T^{alkyl}$ (methyl/ethyl), 43 mol % $T^{Ph}$; with 16 mol % silanol.

Comparative Example 1: Ph Elastomer 71.05 g of RMS-2310 ($M^{Vi}_{25}T^{Ph}_{75}$; 58% solid in toluene), 15.25 g of RMS-352 ($M^H_2D^{Ph2}$), and 0.09 g RMS-063 (inhibitor) diluted in toluene by factor of 10 was charged into 250 mL pear flask. Toluene was removed from the mixture by using Heidolph rotary evaporator with final pull for 2 hour at 3 mbar vacuum and bath temperature of 80° C. 50.65 g of aforementioned solvent stripped resin mixture was transferred to Max100 dental mixer cup and added 10.82 g of MP-153SP ($M^{Vi}D^{PhMe}_{25}M^{Vi}$) and 0.38 g of Pt-47D (Pt catalyst 1,3-divinyltetramethylsiloxane complex diluted in isopropanol to 4% Pt) diluted in MP-153SP (2.5 ppm Pt by weight in the final blend). The blend was mixed in Speed Mixer DAC 150 for 60 sec at 3000 rpm. The product was poured into 4"×4" mold and hot pressed at 150° C. for 1 hour to fabricate 1.5 mm thick sheet.

Example 2: Resin-Linear Material of Example 1 into Elastomer Formulation 19 g of RMS-310 ($M^{Vi}_{25}T^{Ph}_{75}$; 58% solid in toluene), 4.14 g of RMS-352 ($M^H_2D^{Ph2}$), 5 μL of RMS-063 (inhibitor), and 19.83 g of Ph-T—120 dp PhMe resin-linear (Ex. 1; 40 weight % solid in toluene) was charged into 100 mL pear flask. Toluene was removed from the mixture by using Heidolph rotary evaporator with final pull for 2.5 hour at 4 mbar vacuum and bath temperature of 80° C. 13.77 g of aforementioned solvent stripped resin mixture was transferred to Max40 dental mixer cup and added 2.90 g of MP-153SP ($M^{Vi}D^{PhMe}_{25}M^{Vi}$) and 0.14 g of Pt-47D (Pt catalyst 1,3-divinyltetramethylsiloxane complex diluted in isopropanol to 4% Pt) diluted in MP-153SP (2.5 ppm Pt by weight in the final blend). The blend was mixed in Speed Mixer DAC 150 for 60 sec at 3000 rpm. The product was poured into 4"×4" mold and hot pressed at 150° C. for 1 hour to fabricate 1.5 mm thick sheet.

Mechanical Property Measurement

Three small tensile dog-bones and three tear trousers were punched from each sheet All samples were measured using an Instron tester. Tensile strength, Young's modulus, and trouser tear are tabulated below. While the tensile results lie within the standard deviation of each other, the addition of PhMe resin-linear did almost doubles the tear strength of the material. This shows the benefit of adding an organosiloxane block copolymer to a hydrosilylation cured Ph elastomer. An interpenetrating network seems to be formed, greatly improving toughness.

| Sample | Peak Tensile Strength (MPa) | Standard Deviation (MPa) | Elongation (%) | Young's Mod. (MPa) | Tensile Stress at Yield (MPa) | Tensile Strain at Yield (%) | Trouser Tear (kN/m) |
|---|---|---|---|---|---|---|---|
| C. Ex. 1 | 3.2 | 0.3 | 34 | 15 | 1.88 | −0.00015 | 1.049 |
| Ex. 2 | 3.4 | 0.5 | 33 | 30 | 1.64 | 0.00043 | 1.898 |

Example 3: Synthesis of Vinyl Functional <1 mol % SiOH 45 wt % $D^{Vi}_{0.045}T^{Ph}_{0.955}$—164 dp PhMe Resin-Linear Reagents:
D(Vinyl)T(Phenyl) Resin—lot #25270-122 (63.97% in toluene) $M_n$=1,812 $M_w$=3,272
Silanol terminated PhMe Siloxane—67.38% in toluene, Lot #8250313 FW=136.3 g/mol Si, 164 dp (from GPC), $M_n$=15,400, 1.22 mol % SiOH (calculated)
10 wt % KOH in water
10 wt % HCl in water Procedure:
A 500 mL 3 neck round bottom flask was loaded with:
Resin (168.83 g of solution=108.0 g of resin)
OH PhMe Polymer (195.90 g of solution=132.0 g of polymer)
The flask was equipped with a thermometer, teflon stir paddle, and a water-cooled condenser. A nitrogen blanket was applied and a heating mantle was used for heating. Reaction mixture was hazy at room temperature. Distilled off some toluene (21.87 g) to increase the NVC to 70%. During heating the reaction mixture turned clear at ~50° C. Cooled to 80° C. Reaction mixture remained clear. At 80° C. added a solution of 10 wt % KOH dissolved in water (1.20 g). Heated at 80° C. for 3 hrs 50 min Added a 10 wt % solution of HCl in water (0.82 g soln) to neutralize the KOH at 80° C. Stoichiometry 1.05 mols acid:1.0 mol KOH. Mixed overnight at room temperature. Heated to reflux and removed water and residual HCl by azeotropic distillation. A toluene pre-filled Dean Stark apparatus was used. Pressure filtered through a 142 mm diameter Magna, Nylon, Supported, Plain, 5.0 Micron filter. Good filtration rate. Increased solids content on a rotovapor under vacuum in a 1 L round bottom flask. Results: Product NVC samples were clear at 150° C. and at room temperature. They were smooth and not tacky.
$^{29}$Si NMR Analysis of Product: $D^{Vi}_{0.020}D^{PhMe}_{0.547}T^{Ph}_{0.433}$; D(vinyl) Si ratio based on amount added to reaction. OH=0.88 mol %; FW=132.3 g/mol Si; 6620 g/mol vinyl (solids basis). GPC analysis: $M_n$=25,840 g/mol, $M_w$=61,774 g/mol.

Example 4: Formulations with Elastomer Composition of C.Ex. 1 Loaded with 10 to 40 wt % of the Resin-Linear of Example 2

Sample Preparation:
26897-017 $D^{(Vi)}$PhT-PhMe low SiOH 0.88 mol % OH
Formulations were designed to balance SiH/Vi=1.
Samples were cast in boats targeting 1 mm thickness
Samples sat in hood at ambient conditions (3 days) and then cured for 3 hrs@ 160° C.

Testing:
Dynamic Mechanical Analysis (DMTA) was done using a temperature sweep −50° C. to 250° C. at 5° C./min. This test generates the strength and elongation at break values.
Tensile Testing was done on an Instron testing frame: 100 mm/min, 1 kN load cell ASTM D1708 Microtensile dog bone (22 mm gauge length 5 mm wide×~1 mm thick). This test generates the storage modulus E' values.

Samples:

| Ex. | DCC Notebook entry | Formulation |
|---|---|---|
| Ex. 4-015-1 | 26687-015-1 | 10% Example 3 in OE-6630 |
| Ex. 4-015-2 | 26687-015-2 | 20% Example 3 in OE-6630 |
| Ex. 4-015-3 | 26687-015-3 | 30% Example 3 in OE-6630 |
| Ex. 4-015-4 | 26687-015-4 | 40% Example 3 in OE-6630 |
| Ex. 4-015-8 | 26687-015-8 | OE-6630 control |

Results:

| Ex. | % Resin-Linear | Appearance | Benzene 30 min 200° C. (ppm) | Strength (MPa) | Elongation at break (%) | E' at 23° C. (MPa) |
|---|---|---|---|---|---|---|
| Ex. 4-015-8 | 0 | Clear | 637 | 3.6 | 51.3 | 71.2 |
| Ex. 4-015-1 | 10 | Clear | 605 | 4.4 | 52.5 | 80.7 |
| Ex. 4-015-2 | 20 | Clear | 452 | 4.5 | 52.8 | 97.2 |
| Ex. 4-015-3 | 30 | Slightly Hazy | 380 | 5.0 | 52.8 | 113.5 |
| Ex. 4-015-4 | 40 | Hazy | 375 | 5.6 | 52.0 | 150.2 |

The invention claimed is:
1. A curable organopolysiloxane composition comprising:
(a) a resin-linear component comprising from 10 to 70 wt % units of $Ar^1SiO_{3/2}$, wherein $Ar^1$ is $C_6$-$C_{20}$ aryl and from 30 to 90 wt % units of $PhCH_3SiO_{2/2}$, wherein Ph is phenyl; said resin-linear component has from 0 to 5 mole % alkenyl groups, and no more than 20 mole % silanol; said resin-linear component having $M_w$ from 20,000 to 90,000; and
(b) an elastomeric component comprising:
(i) a straight-chain organopolysiloxane having per molecule at least two silicon-bonded alkenyl groups and at least one silicon-bonded aryl group;
(ii) a branched-chain organopolysiloxane having an average unit formula: $(RSiO_{3/2})_a(R_2SiO_{2/2})_b(R_3SiO_{1/2})_c(SiO_{4/2})_d(XO_{1/2})_e$ where each R is the same or different substituted or unsubstituted mon- ovalent $C_1$-$C_{20}$ hydrocarbyl group, 0.1 to 40 mole % of all R's are alkenyl groups, more than 10 mole % of all R's are $C_6$-$C_{20}$ aryl groups, X is a hydrogen atom or an alkyl group, a is from 0.45 to 0.95, b is from 0 to 0.25, c is from 0.05 to 0.5, d is from 0 to 0.1, e is from 0 to 0.1, c/a is 0.1 to 0.5, and where component (ii) is used in a weight ratio of 1/99 to 99/1 based on the weight of component (i);

(iii) an organopolysiloxane having per molecule at least two silicon-bonded hydrogen atoms, where component (iii) is used in an amount of 1 to 200 parts by weight for each 100 parts by weight of the total weight of parts (i) and (ii); and (iv) a hydrosilylation catalyst in an amount sufficient to promote curing of the composition.

2. The composition of claim 1 in which the elastomeric component comprises from 3 to 30 wt % of component (i), from 40 to 80 wt % of component (ii), and from 5 to 40 wt % of component (iii).

3. The composition of claim 2 in which the composition comprises from 5 to 70 wt % of the resin-linear component and from 30 to 95 wt % of the elastomeric component.

4. The composition of claim 3 in which component (i) of the elastomeric component comprises units of $R^1R^2SiO_{2/2}$, wherein $R^1$ is $C_6$-$C_{20}$ aryl and $R^2$ is $C_1$-$C_{10}$ alkyl or $C_2$-$C_{10}$ alkenyl; and terminal units of $R^3R^4R^5SiO_{1/2}$, wherein $R^3$ is $C_2$-$C_{10}$ alkenyl and $R^4$ and $R^5$ independently are $C_1$-$C_4$ alkyl.

5. The composition of claim 4 in which, in the $RSiO_{3/2}$ unit, R comprises at least 50 wt % $C_6$-$C_{20}$ aryl groups and, in the $R_3SiO_{1/2}$ unit, R comprises from 20 to 50 wt % $C_2$-$C_{10}$ alkenyl groups.

6. The composition of claim 5 in which a is from 0.55 to 0.9 and c is from 0.1 to 0.45.

7. The composition of claim 6 in which component (iii) of the elastomeric component comprises units of $R^6R^7SiO_{2/2}$, wherein $R^6$ and $R^7$ independently are $C_6$-$C_{20}$ aryl, $C_1$-$C_{20}$ alkyl or $C_2$-$C_{20}$ alkenyl; and terminal units of $R^8R^9R^{10}SiO_{1/2}$, wherein $R^8$, $R^9$ and $R^{10}$ independently are hydrogen or $C_1$-$C_{10}$ alkyl.

8. The composition of claim 7 in which component (i) of the elastomeric component comprises from 5 to 50 units of $R^1R^2SiO_{2/2}$.

9. The composition of claim 8 in which component (iii) of the elastomeric component comprises from 1 to 5 units of $R^6R^7SiO_{2/2}$.

10. The composition of claim 9 in which the resin-linear component comprises 15 to 60 wt % units of $Ar^1SiO_{3/2}$, wherein $Ar^1$ is $C_6$-$C_{20}$ aryl and from 40 to 85 wt % units of $PhCH_3SiO_{2/2}$; and $Ar^1$ is phenyl; and wherein the resin-linear component comprises no more than 10 mole % silanol.

* * * * *